June 8, 1948.  J. B. GORDON  2,443,105
AIRCRAFT ARMAMENT
Filed Nov. 20, 1944   2 Sheets-Sheet 1
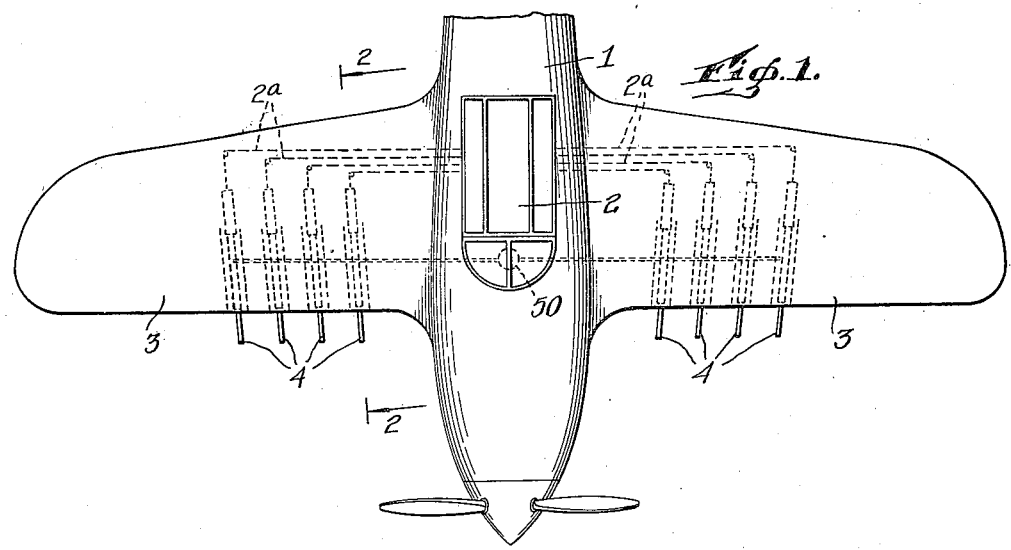
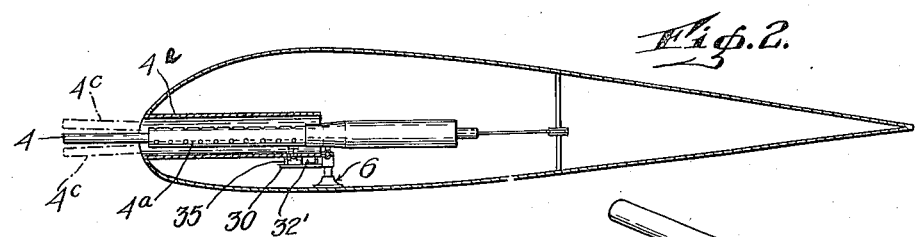
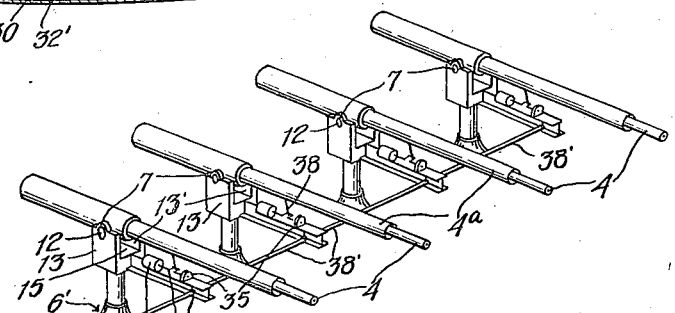
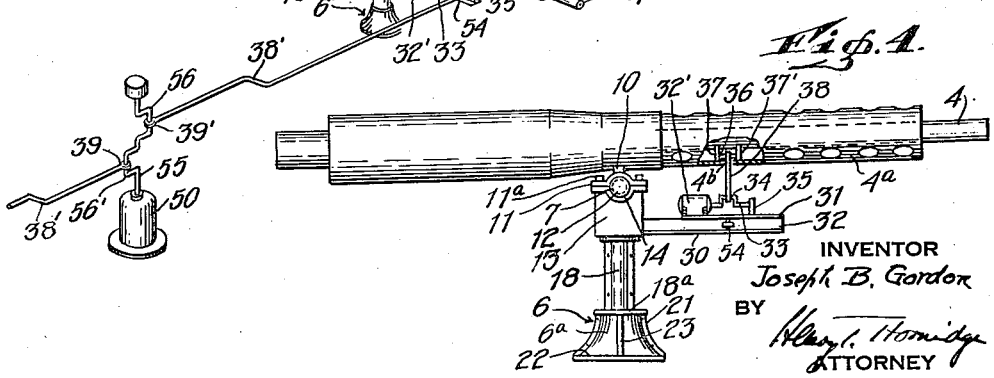
INVENTOR
Joseph B. Gordon
BY
ATTORNEY June 8, 1948. J. B. GORDON 2,443,105
AIRCRAFT ARMAMENT
Filed Nov. 20, 1944 2 Sheets—Sheet 2
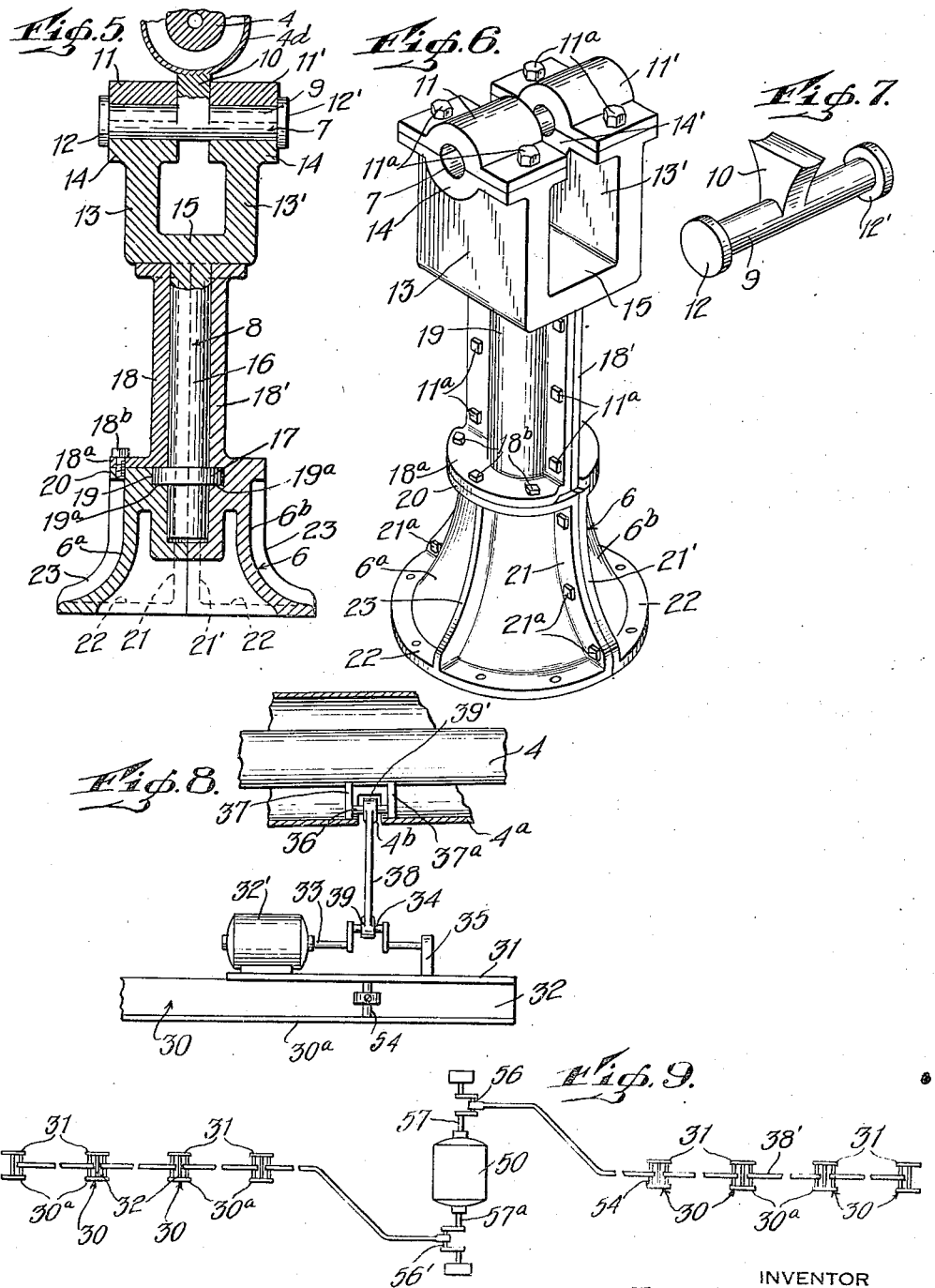
INVENTOR
Joseph B. Gordon
BY
Henry I. Hornidge
ATTORNEY Patented June 8, 1948

2,443,105

UNITED STATES PATENT OFFICE 2,443,105

AIRCRAFT ARMAMENT

Joseph B. Gordon, New York, N. Y.

Application November 20, 1944, Serial No. 564,275

3 Claims. (Cl. 89—37.5)

This invention relates to armament employed in aircraft, and although useful in other airplanes is particularly concerned with the wing gun armament of a single seater airplane where the aiming and firing of the guns is under the control of the pilot.

In the case of such an airplane equipped with a plurality of machine guns or other rapid fire guns, mounted in line in each wing, it is the practice to so mount these guns that the bullet stream from each gun will cross the pilot's line of sight, considering that as a projection of the center fore and aft line of the airplane, about 250 yards forward of the airplane. Sometimes this is modified by converging the outermost gun in each wing so that their bullet streams will cross the line of sight about 350 yards forward of the plane, the successively next outermost pairs at lesser distances and the inboard pair at 250 yards.

With these arrangements, the fire power of the guns is confined to a point of fire on, or at most to a line of fire across the line of sight. While the point of fire secures concentration of fire, all the metal meeting at a certain point, it requires of the pilot an accuracy which is not realized in more than a small percentage of his efforts.

Where the guns of each wing are paired so that their bullet streams meet at different distances forward of the airplane, this condition is somewhat relieved, since two or more points of fire are thus provided along the line of sight, but extreme accuracy is still necessary, since at most only a line of fire is provided.

It is the object of this invention to provide a field of fire which will automatically expand and contract in rapid alternating periods, providing a field of fire which in each one-half second or less of time alternates between a concentrated field 1 foot or less in width and say 20 feet high to an expanded field say 20 feet in width and 20 feet high, the bullet streams from the guns describing sawing or stitching lines across the field of fire in both concentrated and expanded form. By the present invention the wing guns in each wing of the plane converge upon the narrow concentrated field of fire and automatically slightly diverge to produce the expanded field of fire at alternating periods which may be one-half second or less for each period, this rapid contracting and expanding action being produced automatically without requiring any manipulation by the pilot or gunner.

A gunner can scarcely fire a burst of less duration than one second and hence, according to this invention, even the shortest burst will provide an alternate concentration and expansion of the field of fire.

This is accomplished by providing the gun barrels with two continuous angular movements, namely: A vertical angular movement and a lateral angular movement, both movements being synchronized. In this way the bullet streams from each gun form a sawing or stitching line or arc of fire, angularly disposed towards the line of sight, and the composite of all these stitching lines or arcs of all the wing guns provides a substantial field of fire, of sufficient power, and relieves to a very substantial extent the accuracy of aiming and firing now required of the pilot.

The vertical angular movement is provided by an individual motor for each gun suitably connected to the gun by a shaft, crank pin and connecting rod, and the lateral angular movement is provided by a single motor actuating, through individual connecting rods connecting the guns of each wing, all the guns of both wings, the mounting of the guns being such as to permit both said vertical and lateral movements.

Another object of this invention is to provide a mounting which will accomplish the foregoing object and which is sufficiently light and durable and which permits the wearing parts thereof to be quickly replaced.

A further object of this invention is to provide a mounting for such guns which will to a large degree eliminate the chatter or vibration otherwise inherent in such rapid fire guns thereby tending to much greater accuracy in their use.

Further objects of the invention will be apparent in reading the description which follows, in connection with the drawings, in which:

Fig. 1 is a plan view of an aircraft incorporating the invention.

Fig. 2 is a section through the wing profile at 2—2 of Fig. 1.

Fig. 3 is a perspective view of the guns in one wing and the central motor, crankshaft and connecting rods for the lateral movement.

Fig. 4 is a side elevation of one of the guns, its support and motor, crankshaft and connections for the vertical movement.

Fig. 5 is a vertical section of the support showing the upper and lower hinges and the base.

Fig. 6 is a perspective view of the support showing the upper and lower hinges and the base.

Fig. 7 is a perspective view of the pin of the upper hinge.

Fig. 8 is a side elevation partly in section, of the motor, crankshaft and connection to the gun for the vertical movement of the gun.

Fig. 9 is a side elevation of a modified form of the crankshaft of the central motor for the lateral movement.

According to the invention, each of the guns is rotatably mounted so as to permit of both vertical and lateral angular movement. The vertical movement is accomplished by a small precision electric motor of a type now known, provided with a crankshaft and connecting rod to the gun and carried upon a shelf extending from the upper hinge or rotative connection. This motor is regulated to a specific speed—one revolution per second is suitable—and the gun is moved up in one-half revolution of the shaft and down in the other half revolution. Taking 600 shots per minute, or 10 per second as the rate of fire of the gun, five shots will be fired in the course of the up movement and five in the down movement.

The lateral movement is accomplished by a single motor, centrally located between the two wings of the airplane, provided with two crankshafts in line constituting integral extensions of the motor shaft, one for the battery of guns in each wing, this motor being also a precision motor of well known type and regulated to the same speed as the individual gun motors first mentioned. One of the crankshafts of the central motor is connected through connecting rods with the guns in one wing, the other crankshaft being likewise connected through connecting rods to the guns of the other wing.

Thus the guns are given simultaneous synchronized vertical and lateral angular movements.

These movements are continuous during the whole period of attack, although, of course, the guns may be intermittently fired during this period.

The degree of this movement will be regulated by the length of stroke of the crank pin and the relation of the point of attachment of the connecting rod to the gun relative to the point at which the gun is mounted upon the support. It will be understood that a slight angular movement of the gun barrel will give a progressively greater arc of the bullet stream at points forward of the airplane.

Referring to the drawings, Fig. 1 indictates an aircraft fuselage 1, having a pilot's compartment 2, wings 3 extending laterally from the fuselage each carrying a plurality of machine guns 4, operable by a trigger under the control of the pilot, the aircraft indicated being of the single seater type. The broken lines 2a indicate diagrammatically cable connections between the firing mechanism of the gun and the cockpit. The specific means for firing the guns or for preparing them for action or for clearing jams which may occur in action may be any of the well known means for these purposes and are not shown since they form no part of this invention.

Throughout the drawings the guns 4 are shown in general outlines without details of their mechanism since these form no part of the invention. While machine guns 4 are indicated the invention is not confined to them as any gun or cannon useful as aircraft armament may be employed.

Fig. 2 is a section through the wing profile showing one of the guns 4, the usual blast tube 4e, the support 6 and the shelf carrying the motor and crankshaft for the vertical movement of the gun. The dotted lines 4c indicate the extremes of the upper and lower positions of the gun during its vertical reciprocal movement.

In the embodiment of the invention shown, the gun is rotatably mounted upon a sectional base or support 6 which is secured to the floor or other interior structure of the airplane wing, the details of this connection are well known and vary with the wing construction and are not shown as they form no part of the invention. The rotative connection of the gun 4 to the support 6 consists of the upper hinge 7 and the lower hinge 8. Hinge 7 permits the vertical movement and hinge 8 the lateral movement of the gun.

Hinge 7, as shown (Figs. 5, 6, 7) consists of a pin 9 provided with an integral lug 10 which is welded or otherwise secured to the gun. As shown in Fig. 5 the pin 9 is secured to the underside of the casing 4d housing the firing mechanism of the gun at approximately the point of balance of the gun. The pin 9 is sufficiently long to project on each side beyond the gun casing so as to permit the removable cap bearing members 11 and 11' to be readily assembled and removed. Pin 9 is provided at each end with integral flanges or heads 12 and 12' which serve to prevent any lateral displacement of the pin when mounted in the hinge 7.

The body of hinge 7 is of yoke construction consisting of the yoke walls 13 and 13' connected by the base 15, and from this base depends a shaft or pin 16 which forms the pin for the lower hinge 8. The upper ends of the yoke walls 13 and 13' are provided with cap bearing members 14 and 14' which match the removable cap bearing members 11 and 11'. The span of the yoke is sufficient to enable the yoke walls 13 and 13' to clear the gun casing to which the pin 9 is secured so that the portions of pin 9 projecting beyond the side of the gun casing will fit into the cap bearing members 14 and 14', and so that cap members 11 and 11' may be readily secured in position.

The yoke walls 13 and 13', yoke base 15, fixed cap bearing members 14 and 14' and pin 16 together form an integral unit, being welded or cast together to accomplish this. The cap bearing members 11 and 11' are secured to cap bearing members 14 and 14' by bolts 11a.

The lower portion of the pin 16 is provided with an intermediate shoulder 17 to prevent vertical displacement or movement when assembled with the lower hinge 8. The lower hinge 8 consists of the pin 16, the fixed cap bearing member 18', which in preference I make an integral part of one section 6b of the base 6, the removable cap bearing member 18, and the shouldered well or socket 19 formed in the base 6. The removable cap member 18 is provided with a flange 18a at its lower extremity which is secured to the section 6a of the base by bolts 18b, and also secured to the fixed cap member 18' by bolts 11a.

The base 6 is made in two matched sections 6a and 6b divided vertically along the line of joint of cap members 18 and 18'. Both sections are provided with flanges 21 and 21' for securing the two sections together by means of bolts 21a and also with flanges 22 which are secured to the floor or other portion of the interior wing structure, and with webs 23 connected to the platform 20, the flange webs and platform forming with the fixed cap bearing member 18', an integral structure. Each section 6a and 6b of the base is provided with a half well or socket 19 with a shouldered recess 19a to receive the lower portion of the shaft 16 with its shoulder 17. The base 6 is made in two sections to facilitate the assembly and disassembly of the shaft 16 and the well or socket 19. One section, preferably that integral with the fixed cap member 18' will be permanently secured to the floor of the wing and the other section will be secured to the said floor when the assembly is completed.

The pins 9 and 16 preferably are made of steel, the cap bearing members 11 and 11', 14 and 14', 18 and 18' are provided with bearing surfaces and likewise the socket 19, while the body of the cap bearing members, the yoke and support 6 may be made of well known suitable light metal or metal alloy.

Secured to the side walls 13 and 13' or base 15 of the yoke of the upper hinge 7 is a shelf 30 of inverted T cross section, extending horizontally under the protecting tube 4a. It is provided with a flange 31 transverse the web 32 to provide a platform to support the motor and crankshaft bearing to be described. The motor 32' is a precision electric motor of light weight, of a type now well known and regulated to a definite speed, for instance 60 revolutions per minute.

The motor is mounted upon the platform 31. A crankshaft 33 constituting an integral extension of the shaft of motor 32' is mounted at its outer end in a bearing 35 of any suitable type, likewise mounted upon the platform 31. The crankshaft intermediate its length has a crank pin 34 offset from the crankshaft to provide a stroke of any predetermined length dependent upon the vertical extent of the field of fire desired. The crankshaft 33 will be short and the motor 32' and crankshaft 33 will be mounted on the shelf 31 as close as possible to the point of connection of the hinge 7 with the gun casing. The gun barrel with its surrounding protecting tube 4a is customarily mounted within a blast tube 4e of greater diameter so as to afford room for vertical and lateral angular deflection of the gun barrel as required and it will be understood that this blast tube is of sufficient interior diameter to also accommodate the vertical reciprocal motion of the gun barrel as indicated in Fig. 2. A slot 4b is formed in this blast tube and the protecting tube sufficiently wide and long to permit connecting rod 38 to be inserted therethrough and to accommodate the scope of its swing.

A pin 36 is also provided for the gun barrel 4 immediately over crank pin 34, which is mounted in arms 37 and 37a welded or otherwise rigidly secured to the gun barrel. Crank pin 34 and pin 36 are connected by a connecting rod 38 provided at each end with cap bearings 39 and 39".

The motors 32' of all the guns in both wings will be connected to a single switch or control by any well known means not shown, within reach of the pilot so that all motors for the vertical movement can be started and stopped at the will of the pilot.

Figs. 1, 3 and 9 show generally the location of the single motor 50 for imparting a reciprocal lateral movement to the guns. The motor 50 with its crankshaft 55 is mounted vertically.

The crankshaft as shown in Fig. 3 is a single shaft 55 with two opposed crank pins 56 and 56'. Crank pin 56 actuates the guns in the right wing, facing the drawing Fig. 1 and crank pin 56' actuates the left wing guns. The stroke or throw of crank pins 56 and 56' will be predetermined dependent upon the lateral extent of the field of fire desired. If may be the same as or differ from the stroke of crank pins 34. A modified and preferable form of crankshaft is shown in Fig. 9 wherein a shaft extends from each end of the motor 50, shaft 57 for actuation of the right wing guns and shaft 57a for actuation of the left wing guns. The crankshafts of both forms, Fig. 3 and Fig. 9 preferably will be integral extensions of the motor shaft.

The connection between crank pin 56 and pin 54 mounted on the shelf 30 is a connecting rod 38' provided at each end with cap bearings 39' similarly to the connecting rod 38 and cap bearings 39 used in connecting the crank pin 34 with pin 36 for the vertical motion except that in this case the pins 54 are vertically mounted. The pins 54 are mounted between the base 30a and the platform 31 of the shelf 30 on each side of the web 32 underneath crank pin 34.

It will be understood that the motor crank shaft is connected through crank pin 56 and connecting rod 38' to the nearest gun shelf 30, and the successive guns will be connected in order by individual connecting rods 38' mounted on pins 54 on each side of shelf 30, so that the rotation of crankshaft 56 will simultaneously move all of the guns in each wing. The connecting rods which respectively connect crank pins 56 and 56' to their respective nearest gun shelf 30, are bent so as to overcome the vertical displacement of crank pins 56 and 56' from the plane of the shelves 30.

Motor 50 is connected by any well known means to a switch or control within ready reach of the pilot, the control of this motor being independent of the control of the motors 32' so that the pilot at will may operate both motors 32' and motor 50 to secure both vertical and lateral movement of the guns, or either motors 32' or motor 50 alone so as to select the movement he desires.

Crank pins 56 and 56' are arranged in 180° opposition so that when the motor is in operation the guns of both wings are pulled and converge during one-half revolution of the crank shaft and are pushed and diverge during the other half revolution.

If the crank arms of the individual motors 32' for the vertical movement are arranged in alternating positions, for instance if the crank pin for the first gun (meaning the most inboard gun) is up, the crank pin for the next gun, down, and so on, a better fire pattern will be realized, the vibration will be better cushioned and the tendency of the plane to turn clockwise on its line of motion axis will not be increased.

In the operation of the said device, the pilot will start the motors 32' and 50 by means of a remote control switch or push button within ready reach, before he actually begins firing, so as to give the motors the opportunity to attain their proper speed, and he will keep the motors running during the period of fire. With both motors running, through the crankshafts, crank pins and connecting rods described, the guns in each wing will be given both vertical and lateral reciprocal motions, the bullet stream of each gun thus describing sawing or stitching lines or arcs of fire.

The guns will previously have been adjusted for example by converging all the guns to a point in the line of sight 250 yards forward of the airplane, or any variation of this desired.

When firing has ceased, the pilot will stop motors 32' and 50 by a control within reach.

The pilot may if he prefers operate only one of the said motors obtaining only a vertical or a lateral reciprocal movement of the guns but not both; or he may decide not to use either motor.

While I have described an embodiment of my invention as applied to the wing guns of a single seater fighter airplane, my invention is not intended to be limited to that application and is capable of use with any group of two or more guns employed in aircraft where a field of fire is advantageous.

Thus it could be advantageously employed in the turret guns of airplanes manipulated by a gunner other than the pilot. In addition to securing the advantage of a field of fire it will be found that the chattering or vibration of the guns which diminishes the accuracy of fire is largely eliminated.

My invention likewise is not to be construed as limited to the use of electric motors as described as other means for actuating the guns may be employed, for instance by power from a hydraulic system.

It will be further understood that the construction details herein described with reference to the drawings may be varied according to requirements without departing from the scope of my invention.

I claim:

1. In combination, a plurality of guns in an airplane each gun rotatably mounted upon an individual support comprising a base, pivotal means for swinging the gun vertically about an axis normal to the axis of the gun and pivotal means for swinging the gun laterally about an axis normal to the axis of the gun, an electric motor for each gun mounted upon a support carried by and protruding from the first named gun support underneath the gun for imparting thereto and maintaining an angular vertical reciprocal motion of said gun, and means for imparting to all said guns and maintaining an angular lateral reciprocal motion of said guns, said last named means including a motor and a crankshaft driven thereby, mounted vertically in said airplane.

2. In combination, a plurality of wing guns in an airplane, each gun rotatably mounted upon a support comprising a base, a first pivotal means removably connected to the gun for swinging the gun vertically and a second pivotal means underlying the first pivotal means for swinging the gun laterally, about respective axes normal to the axis of the gun, the gun being secured to said base through the medium of both said means, a shelf secured to the first pivotal means and protruding therefrom underneath the barrel of the gun, means mounted upon said shelf for imparting an angular vertical reciprocal motion to said gun comprising a motor having a crankshaft, a connecting rod removably and rotatably mounted thereon and upon the gun, and means mounted for imparting an angular lateral reciprocal motion to all said guns in unison comprising a motor having a crankshaft, said guns being laterally connected to each other by removably and rotatably mounted connecting rods, the innermost gun being similarly connected to said last named crankshaft and the said vertical and lateral angular reciprocal movements being synchronized.

3. In combination, a battery of guns in each of the opposed wings of an airplane, each gun pivotally mounted upon an individual support provided with pivotal means for swinging the gun vertically and pivotal means for swinging the gun laterally about axes normal to the axis of the gun, an electric motor for each gun mounted underneath the gun upon a shelf secured to said support so as to swing with the gun about a vertical axis normal to the axis of the gun, said motor having a crankshaft, a connecting rod removably mounted thereon and on the gun, for imparting a vertical oscillation to the gun, a single stationary electric motor mounted between the said batteries having a crankshaft and a connecting rod mounted thereon and on the innermost gun of one of said batteries and an opposed crankshaft and a connecting rod mounted thereon and one the innermost gun of the other said battery, the other guns in each said battery being connected to each other and to the innermost gun of the battery by intermediate connecting rods, for imparting a lateral oscillation to all the guns in each said battery in unison about an axis normal to the axis of the guns, and the said vertical and lateral oscillations of said guns being synchronized.

JOSEPH B. GORDON.

REFERENCES CITED

The following references are of record in the file of this patent:

UNITED STATES PATENTS

| Number | Name | Date |
|---|---|---|
| 1,367,641 | Udart | Feb. 8, 1921 |
| 1,660,595 | Butler | Feb. 28, 1928 |
| 2,100,790 | Taylor | Nov. 30, 1937 |
| 2,362,199 | Glowka | Nov. 7, 1944 |

FOREIGN PATENTS

| Number | Country | Date |
|---|---|---|
| 218,806 | Great Britain | July 17, 1924 |
| 329,901 | Italy | Sept. 26, 1935 |
| 828,137 | France | Feb. 7, 1938 |